(12) United States Patent
Shao (10) Patent No.: US 7,920,375 B2
(45) Date of Patent: Apr. 5, 2011

(54) SUPPORT MODULE AND DISPLAY DEVICE USING THE SAME

(75) Inventor: Kuan-Chang Shao, Taipei (TW)

(73) Assignee: AU Optronics Corporation, Hsinchu (TW)

( * ) Notice: Subject to any disclaimer, the term of this patent is extended or adjusted under 35 U.S.C. 154(b) by 159 days.

(21) Appl. No.: 12/210,155

(22) Filed: Sep. 12, 2008

(65) Prior Publication Data

US 2009/0073339 A1    Mar. 19, 2009

(30) Foreign Application Priority Data

Sep. 14, 2007   (TW) ................................ 96134425 A (51) Int. Cl.
*H05K 5/00*    (2006.01)
*H05K 7/00*    (2006.01)

(52) U.S. Cl. .............................. 361/679.22; 361/679.21

(58) Field of Classification Search ............ 361/679.22, 361/679.21
See application file for complete search history.

(56) References Cited

U.S. PATENT DOCUMENTS

| | | | |
|---|---|---|---|
| 6,967,668 B2 * | 11/2005 | Byoun et al. ..................... | 345/55 |
| 7,701,699 B2 * | 4/2010 | Ma ............................ | 361/679.21 |
| 2006/0087596 A1 * | 4/2006 | Park et al. ..................... | 348/739 |

FOREIGN PATENT DOCUMENTS

| | | |
|---|---|---|
| CN | 2348236 | 11/1999 |
| CN | 2440242 | 7/2001 |
| CN | 1423176 A | 6/2003 |

* cited by examiner

*Primary Examiner* — Jayprakash N Gandhi
*Assistant Examiner* — Anthony M Haughton (57) ABSTRACT

A support module for supporting a display module and a display device using a support module and the display module is disclosed in the present invention. The display device includes display module housing, a display module, and a support module. The support module includes a linking unit and a supporting unit. The linking unit and the supporting unit are partially linked and their corresponding positions are changeable. The linking unit extends out a first length or a second length from the receiving portion. The display device further includes a base. When the linking unit extends out the first length from the receiving portion, the display module housing separates from the base. When the linking unit extends out the second length from the receiving portion, the display module housing can be connected to the base by the linking unit.

15 Claims, 10 Drawing Sheets

SUPPORT MODULE AND DISPLAY DEVICE USING THE SAME

BACKGROUND OF THE INVENTION

1. Field of the Invention

The present invention relates to a support module and the display device using the support module. Particularly, the present invention relates to a support module for supporting a display module and the display device having the display module and the support module.

2. Description of the Prior Art

Recent years, flat display devices, such as LCD television or monitor, are widely used. This kind of display device has a supporting stand detachable to the housing of the display device.

Figure 1A:
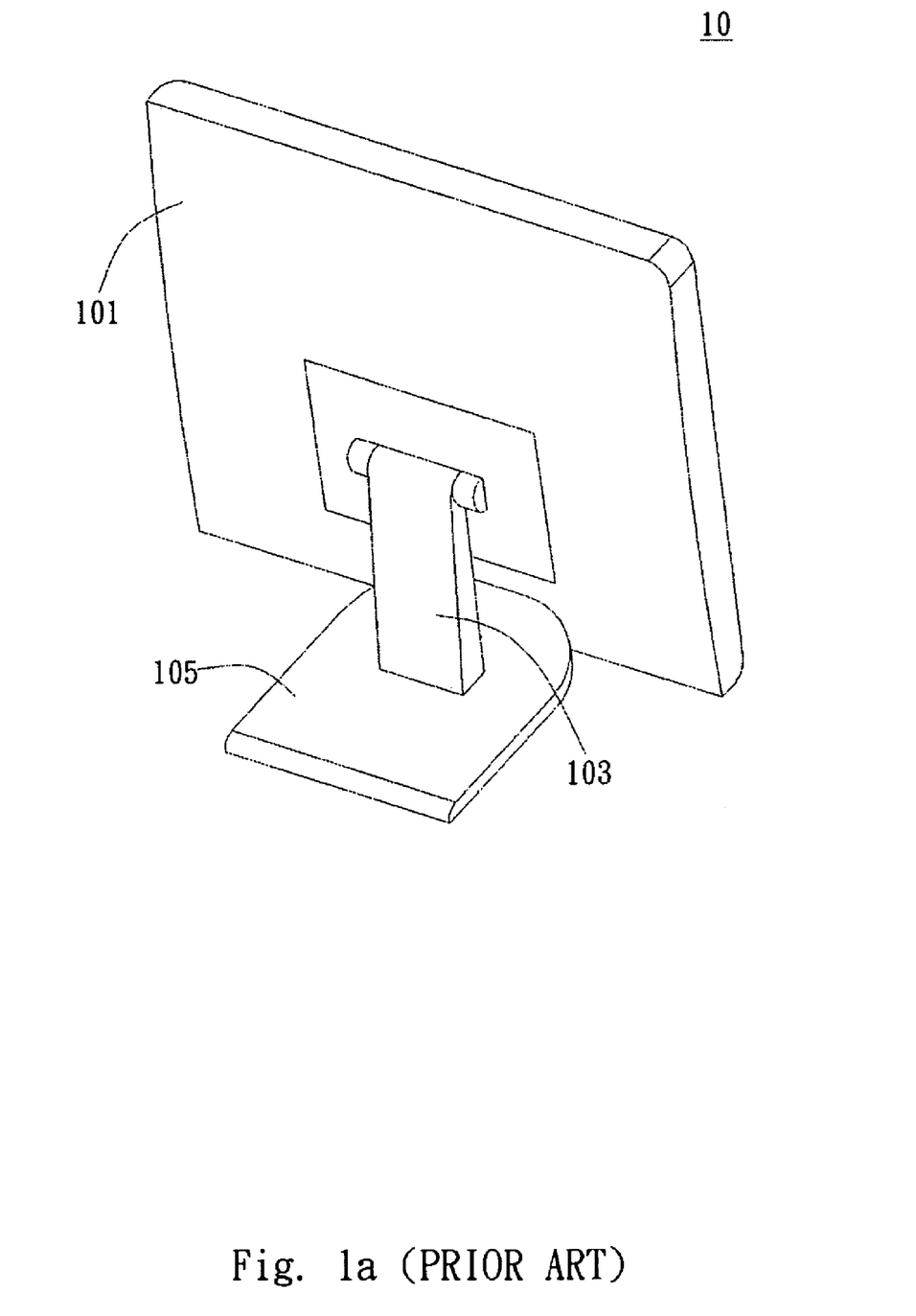
FIG. 1a is a schematic view of display device known in the art.
Figure 1B:
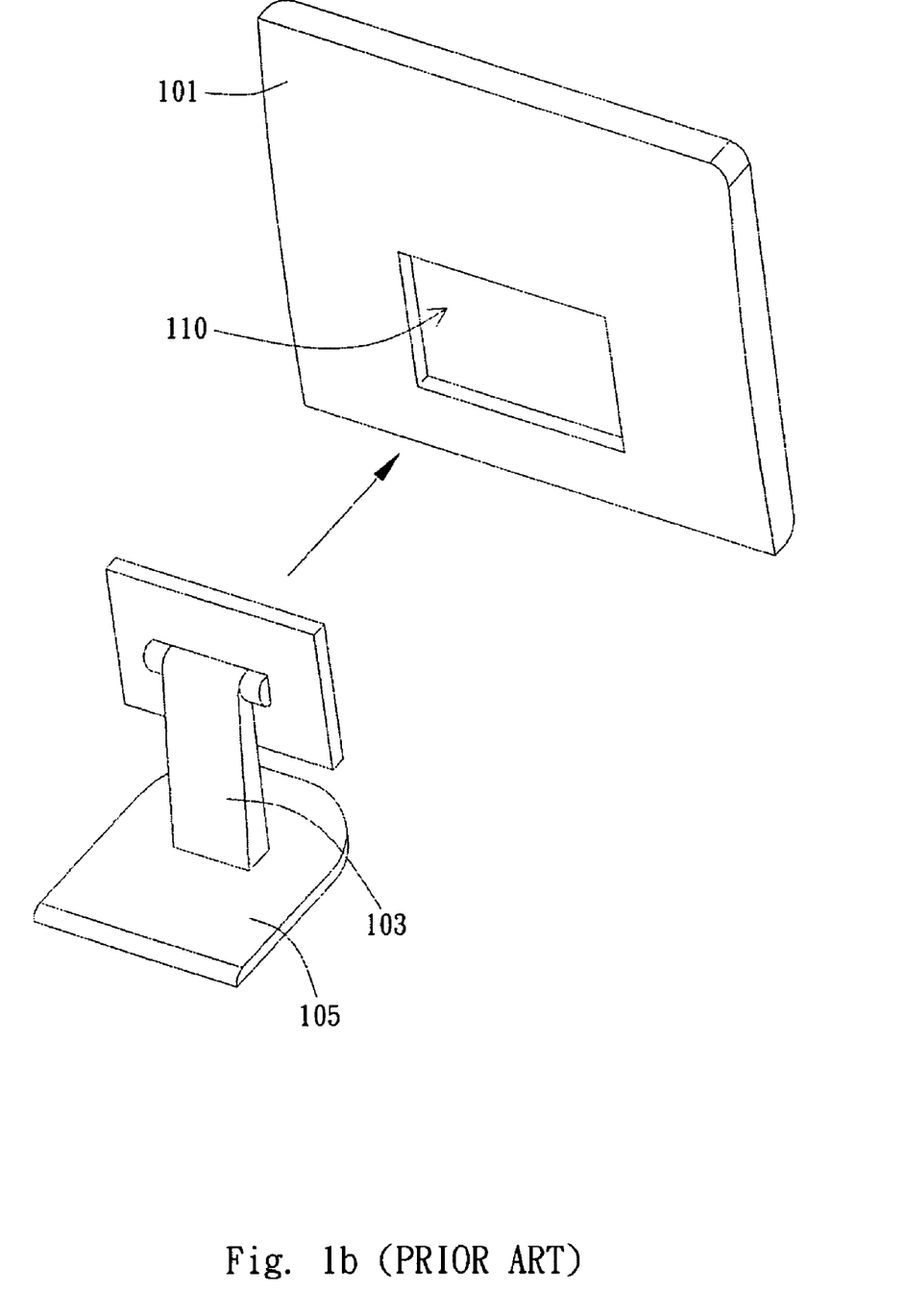
FIG. 1b is a schematic view of display device known in the art.

FIG. 1a shows a display device 10 known in the art. Supporting stand 103 is detachably disposed in the receiving portion 110 of the housing 101. As shown in FIG. 1b, after supporting stand 103 is detached from the housing 101, receiving portion 110 of the housing 101 is exposed to view. The part of the support module inside the display device 10 may be seen via the receiving portion 110, and thus dust or dirt may fall into the receiving portion. Besides, structures or components exposed from the receiving portion 110 may bring an unpleasant feeling to users, or even cause users harm if users touch the components. Furthermore, when users want to hang the display device 10 on the wall, they have to disassemble the supporting stand 103 from the housing 101, and put the supporting stand 103 and the base 105 away, causing inconveniences.

SUMMARY OF THE INVENTION

It is an objective of the present invention to provide a safe support module and the display device using the support module of present invention.

It is another objective of the present invention to provide a user-friendly display device.

Display device of the present invention includes display module housing, a display module, a support module. Display module housing has a substantially flat rear surface, and a receiving portion is formed between the display module and the rear surface. Opening of the receiving portion is formed on the bottom end of the display module housing. The support module includes a supporting unit and a linking unit. The display module is disposed in the display module housing, and the supporting unit is disposed in the receiving portion and positioned between the display module and the display module housing. The supporting unit includes a supporting positioning portion, the linking unit includes a first linking positioning portion and a second linking positioning portion, and the supporting positioning portion can connect to the first linking positioning portion or to the second linking positioning portion.

DETAILED DESCRIPTION OF THE PREFERRED EMBODIMENT

Figure 2A:
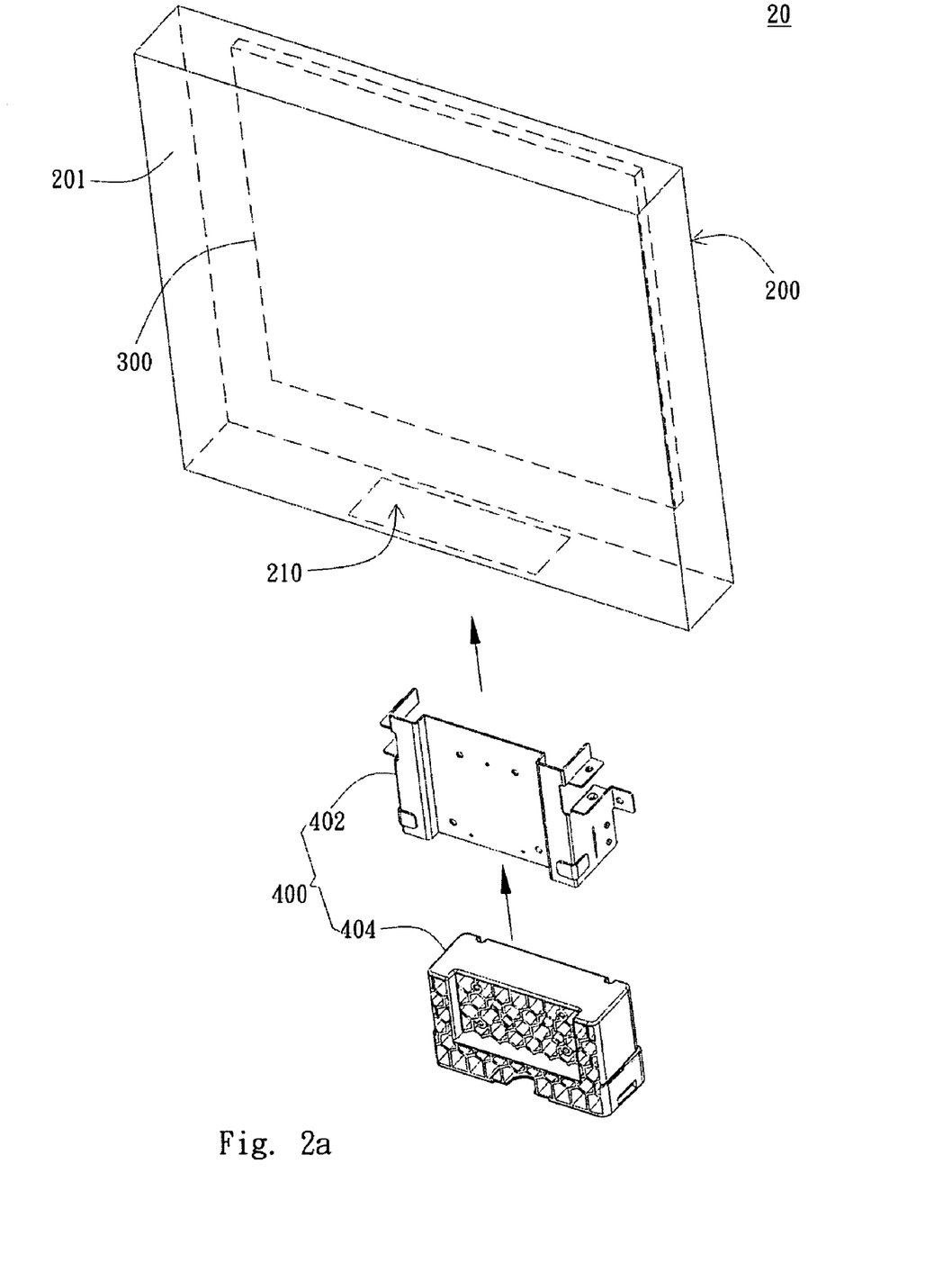
FIG. 2a is an exploded view of display device of the present invention.

FIG. 2a shows an exploded view of the display device 20 of one embodiment of present invention. The display device 20 includes a display module housing 200; a display module 300, a support module 400. The support module 400 includes a supporting unit 402 and a linking unit 404 connected to each other. The display module housing 200 has a substantially flat rear surface 201, and a receiving portion 210 is formed between the rear surface 201 and the display module 300. An opening of receiving portion 210 is formed on the bottom of the display module housing 200. In other words, the display module 300 is placed inside the display module housing 200, and the supporting unit 402 is disposed in the receiving portion 210 and positioned between the display module 300 and the display module housing 200. Specifically speaking, the supporting unit 402 fixes with the display module 300 and the inner wall of the display module housing 200, whereby the display module 300 is stably disposed in the display module housing 200.

Figure 2B:
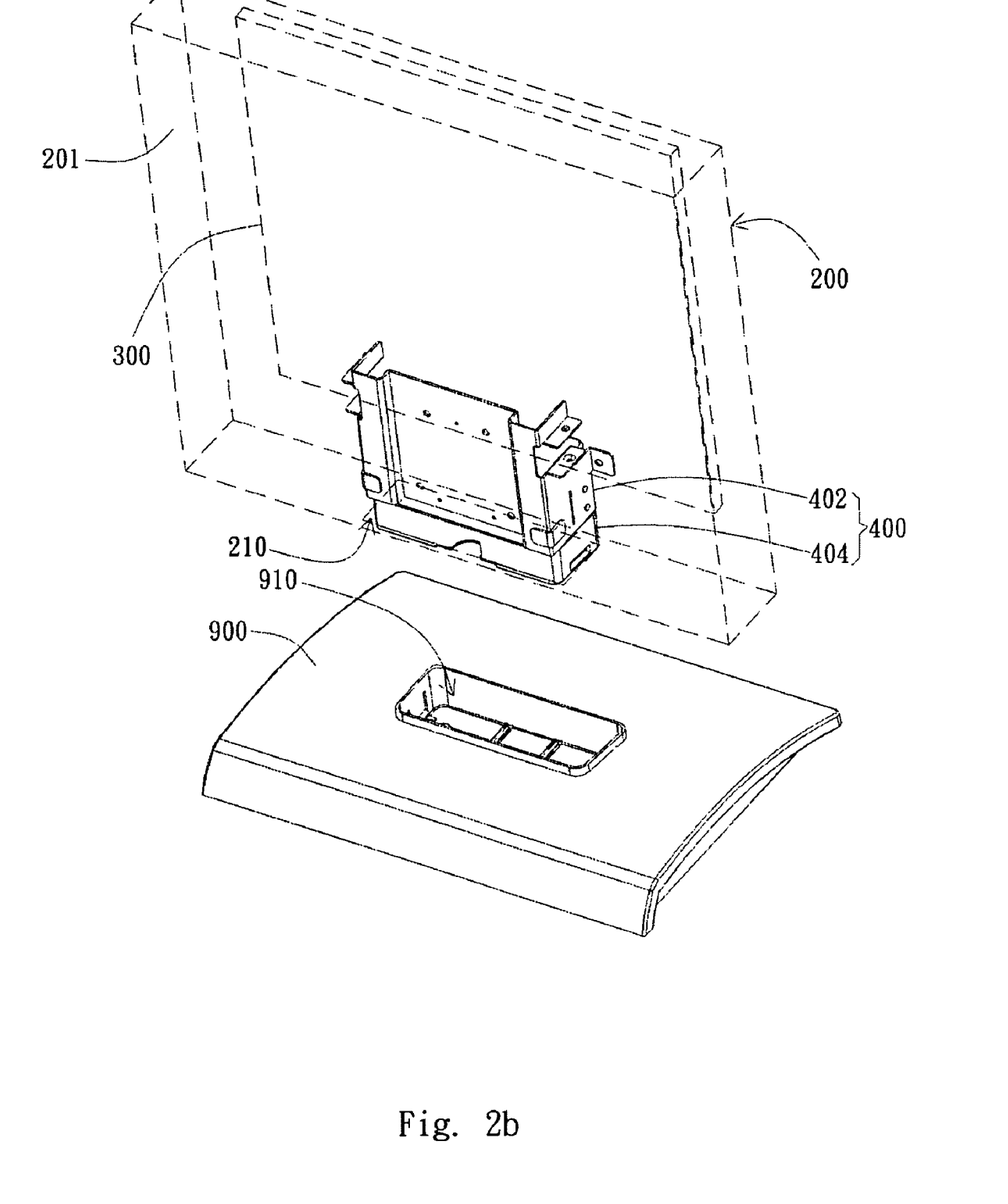
FIG. 2b is a schematic view of display device connected to the base in the present invention.
Figure 2C:
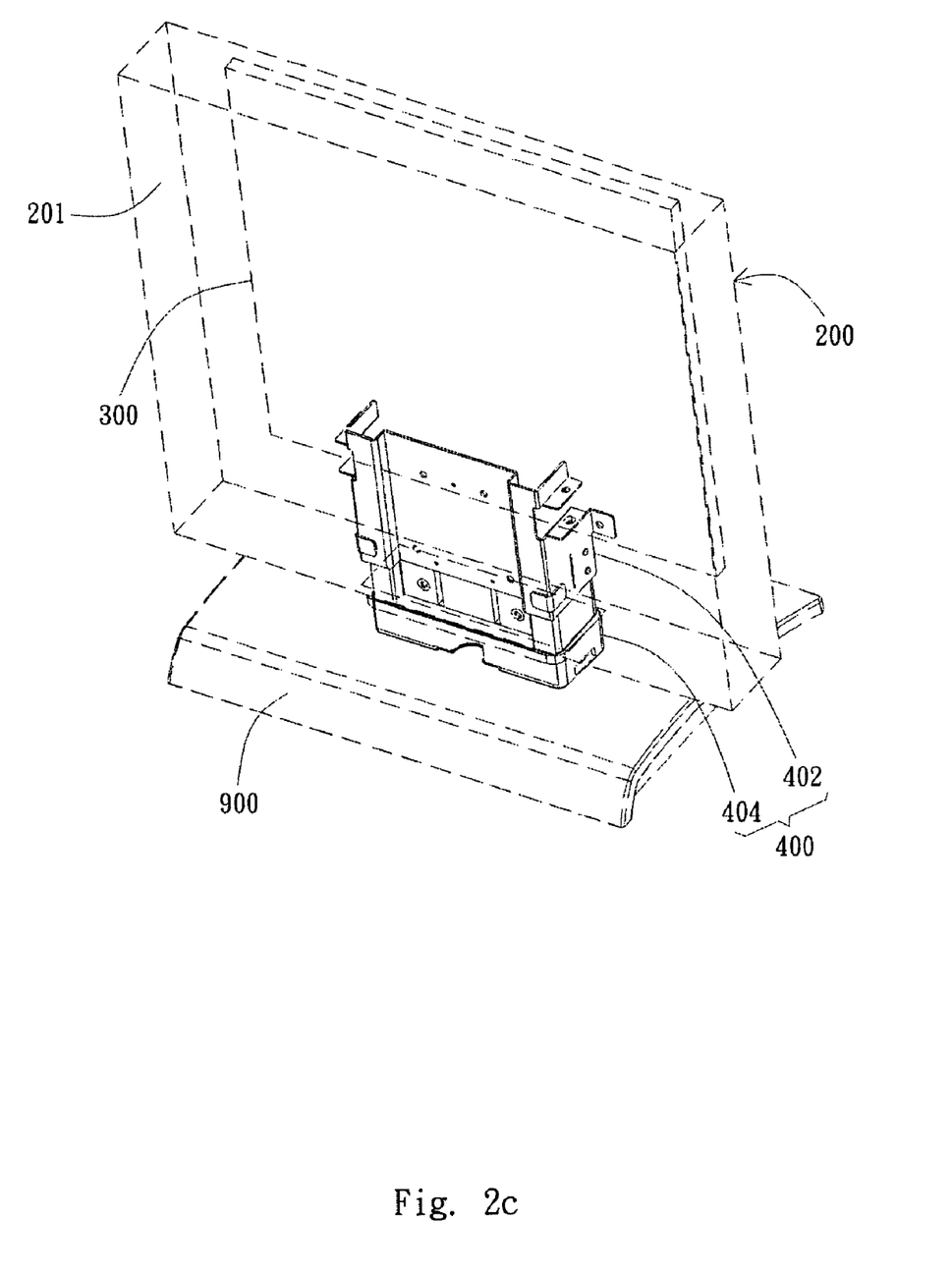
FIG. 2c is a schematic view of display device separated from the base in the present invention.

Please refer to FIG. 2b and FIG. 2c, the linking unit 404 and the supporting unit 402 are partially connected to each other. The linking unit 404 extends out a first length $L_1$ or a second length $L_2$ from the receiving portion 210, and the second length $L_2$ is greater than the first length $L_1$. In fact, the first length $L_1$ can be zero, meaning that the linking unit 404 can be totally received in the receiving portion 210. In this embodiment, the display device 20 further includes a base 900. When the linking unit 404 extends out the first length $L_1$ from the receiving portion 210, the display module housing 200 separates from the base 900 as shown in FIG. 2b. At this time, the support module 400 is received in the display module housing 200, providing users to hang the display device 20 on the wall, and making the substantially flat rear surface of the display device 20 to stay close to the wall in parallel manner. When the linking unit 404 protrudes out from the display module housing 200, whereby the linking unit 404 extends out the second length $L_2$ from the receiving portion 210, the linking unit 404 is disposed in the base opening 910 of the base 900. As shown in FIG. 2c, thus, users can put the display device 20 on a surface.

Figure 3A:
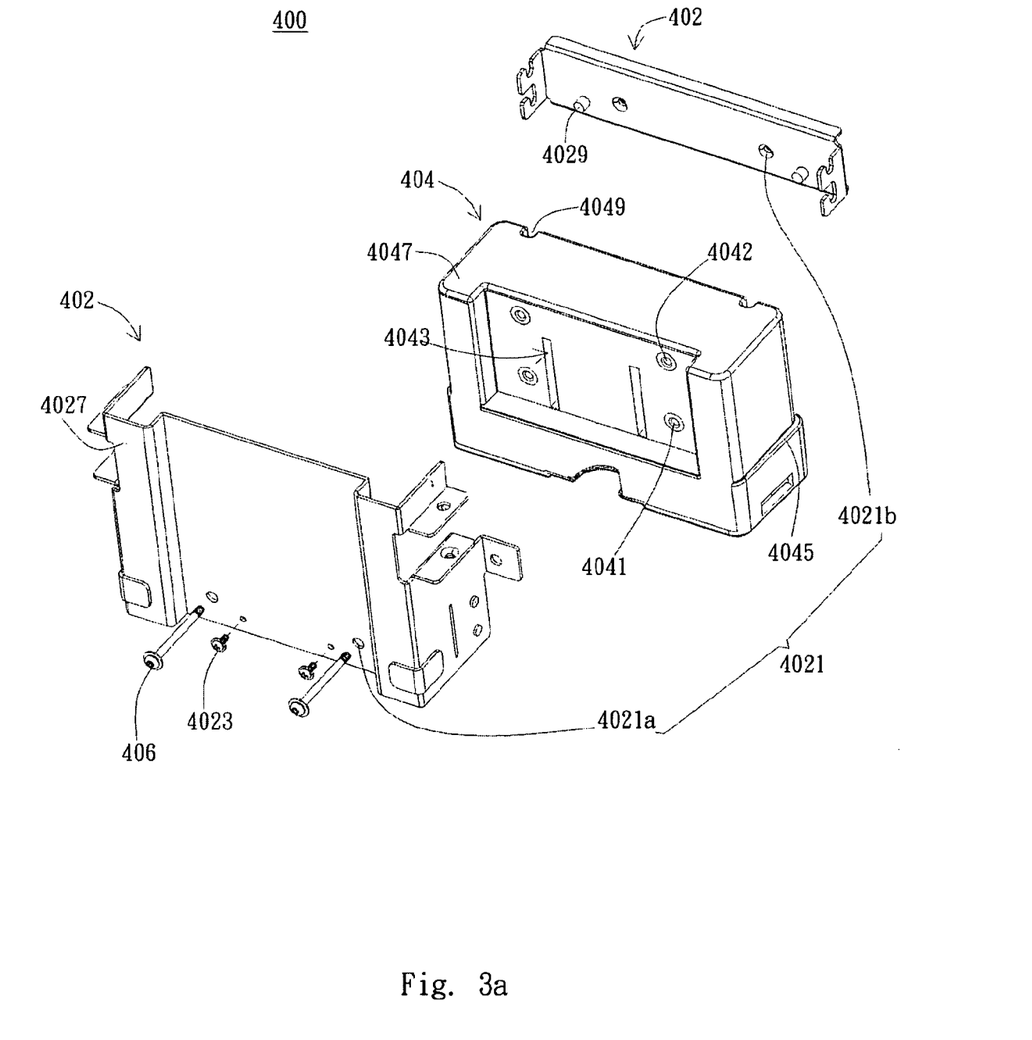
FIG. 3a is an exploded view of support module of the present invention.

FIG. 3a shows an exploded view of the support module 400 of one embodiment of the present invention. The support module 400 in this embodiment includes the supporting unit 402, the linking unit 404 and a fixing mechanism 406. The supporting unit 402 and the linking unit 404 are connected to each other by the fixing mechanism 406. As shown in FIG. 3a, the supporting unit 402 is structured with two parallel sheets, generally made by metal. The linking unit 404 has pillared structure of certain thickness. The linking unit 404 is generally made of plastic and placed between two parallel sheets of the supporting unit 402. In different embodiments, the linking unit 404 has different structures. As shown in FIG. 2a, the linking unit 404 has honeycomb-like pillared structure providing support strength. In FIG. 3a, the linking unit 404 has pillared structure with flat smooth surface. In other embodiments, the supporting unit can be other types of structures, e.g. hollow pillared structure formed in one piece; in this embodiment, the linking unit is disposed in the hollow space of the supporting unit with hollow pillared structure. Structures described above can strengthen connection between the supporting unit 402 and the linking unit 404, thereby avoiding deformation caused by different stresses among different materials of the supporting unit 402 and linking unit 404.

As shown in FIG. 3a, the supporting unit 402 has a supporting positioning portion 4021, and the linking unit 404 has a first linking positioning portion 4041 and a second linking positioning portion 4042. In this embodiment, positioning portions have hole-shaped structures, and the fixing mechanism 406 has long, pillared structure. The fixing mechanism 406 is disposed through the supporting positioning portion 4021 and passes through the first linking positioning portion 4041 or through the second linking positioning portion 4042.

Figure 3B:
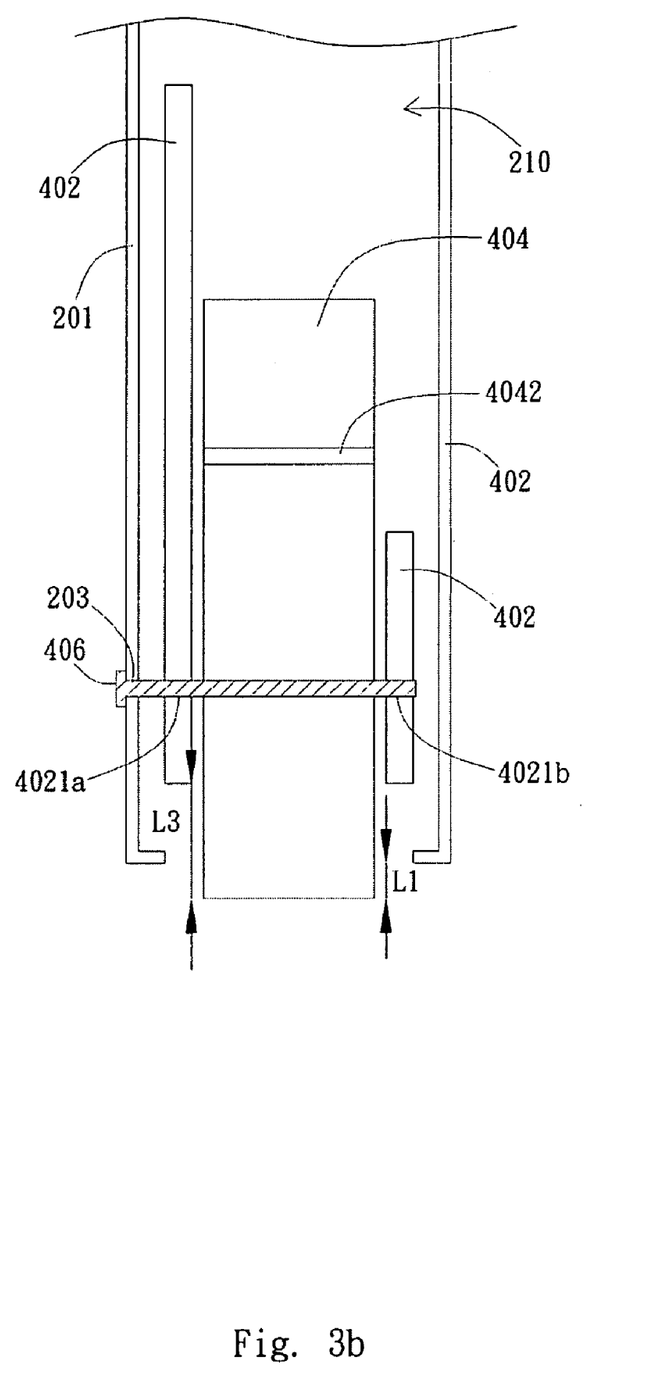
FIG. 3b and FIG. 3c are cross-section of a side views of support module and the display module housing of the present invention.
Figure 3C:
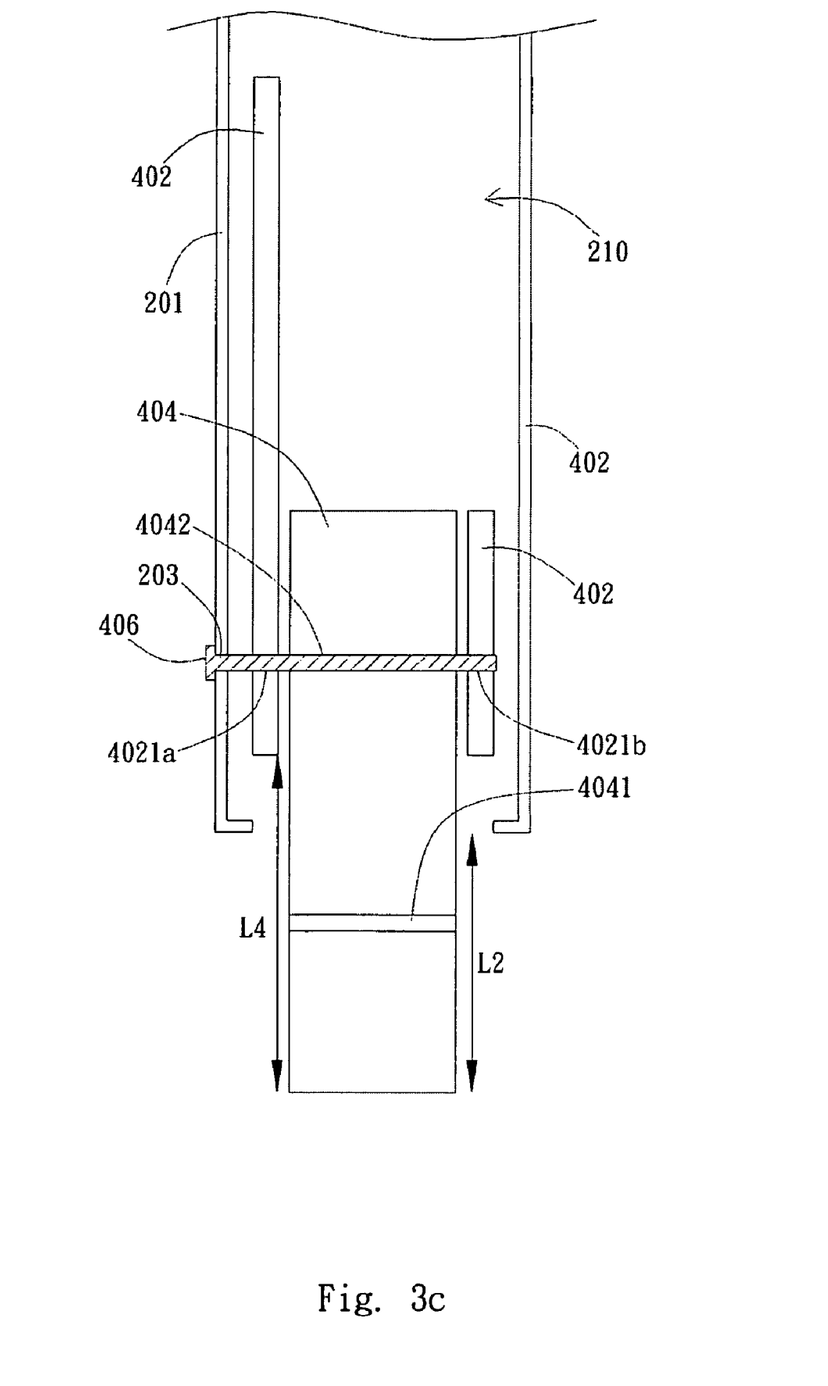

FIG. 3b and FIG. 3c are cross-section side view of the support module 400 and the display module housing 200. FIG. 3b is a schematic view of the supporting positioning portion 4021 connecting to the first linking positioning portion 4041 via the fixing mechanism 406. In this embodiment, the fixing mechanism 406 has threaded structure, e.g. a long shape screw; the supporting positioning portion 4021 is formed as a first hole, and the first linking positioning portion 4041 is a first threaded hole. In FIG. 3b, the long shape screw 406 can be disposed through the first hole then enters the first threaded hole to tighten therein. FIG. 3c is a schematic view of the supporting positioning portion 4021 connecting to the second linking positioning portion 4041 via the fixing mechanism 406. The second linking positioning portion 4042 is a second threaded hole. In FIG. 3c, the long shape screw 406 passes through the first hole then enters the second thread hole to tighten therein. More specifically, refer to FIGS. 3b and 3c, the rear surface 201 of the display module housing 200 has a rear opening 203, whereas the fixing mechanism 406 first passes through the rear opening 203 then passes through the supporting positioning portion 4021 and optionally passes through the first linking positioning portion 4041 or the second linking positioning portion 4042, to fix them together. In this manner, users can adjust positions of the linking unit 404 of the support module 400 without taking the rear surface 201 apart from the display module housing 200.

In FIG. 3a, a plurality of supporting positioning portions 4021 are disposed on the supporting unit 402, such as the first hole 4021a and the third hole 4021b. In this embodiment, the first hole 4021a and the third hole 4021b are at corresponding positions to each other on the two sheets of support module 400.

As shown in FIG. 3a, a limiting unit 4023 is formed on the supporting unit 402, and a limiting groove 4043 and a stop end 4045 are formed on the linking unit 404. The limiting unit 4023 is movably disposed in the limiting groove 4043. For example, the limiting unit 4023 can be a short post, a protrusion, or a short screw, and the limiting groove 4043 can be a rectangular groove. The position of the limiting unit 4023 on the supporting unit 402 should be corresponding to the position of the limiting groove 4043 on the linking unit 4043. The limiting unit 4023 and the limiting groove 4043 are provided to limit movement range of the linking unit 404 relative to the support unit 402. On the one hand, the limiting unit 4023 and the limiting groove 4043 facilitate the linking unit 404 to connect to support unit 402, on the other hand, the limiting unit 4023 and the limiting groove 4043 can also prevent the linking unit 404 from coming off from the supporting unit 402.

Figure 3D:
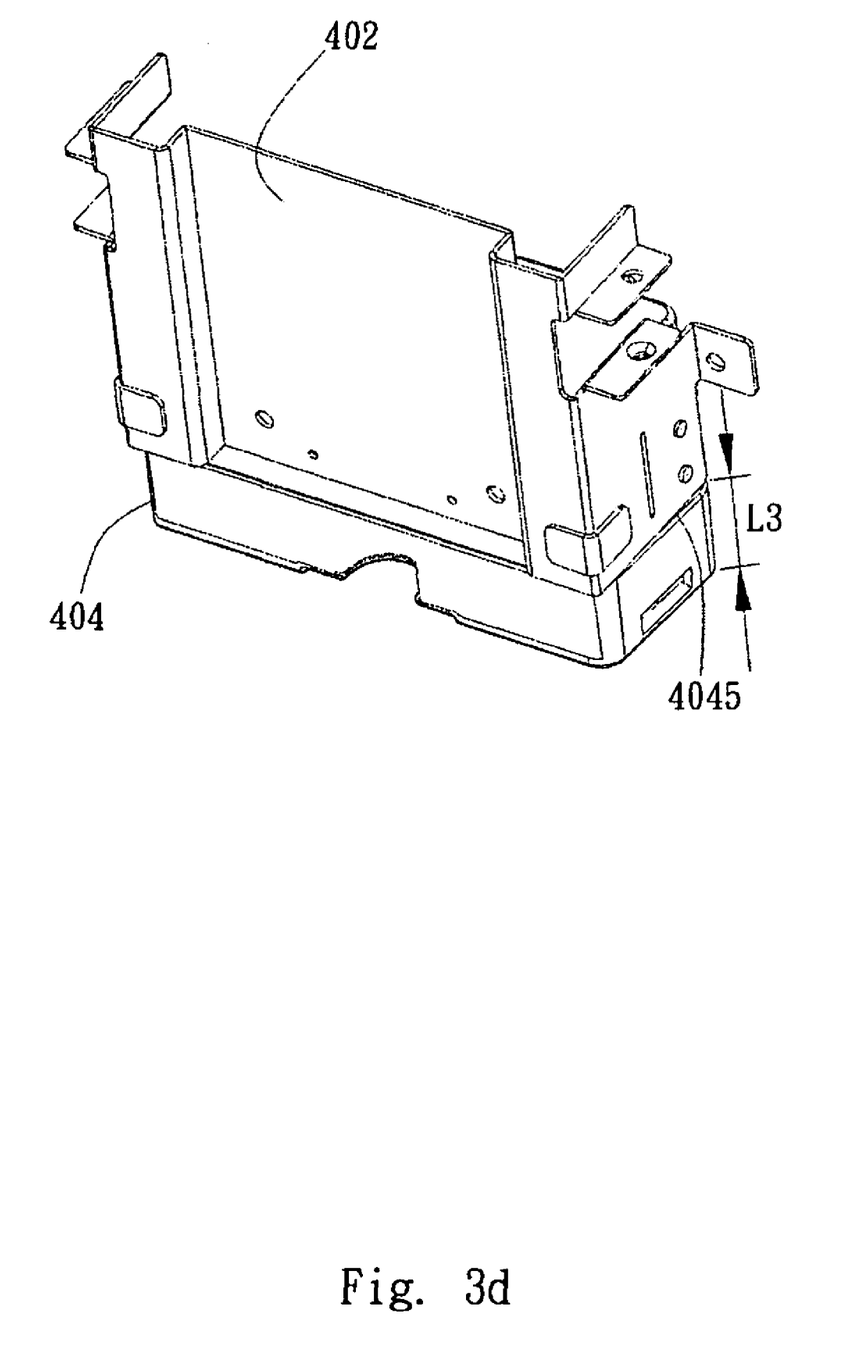
FIG. 3d is a perspective view of FIG. 3b.
Figure 3E:
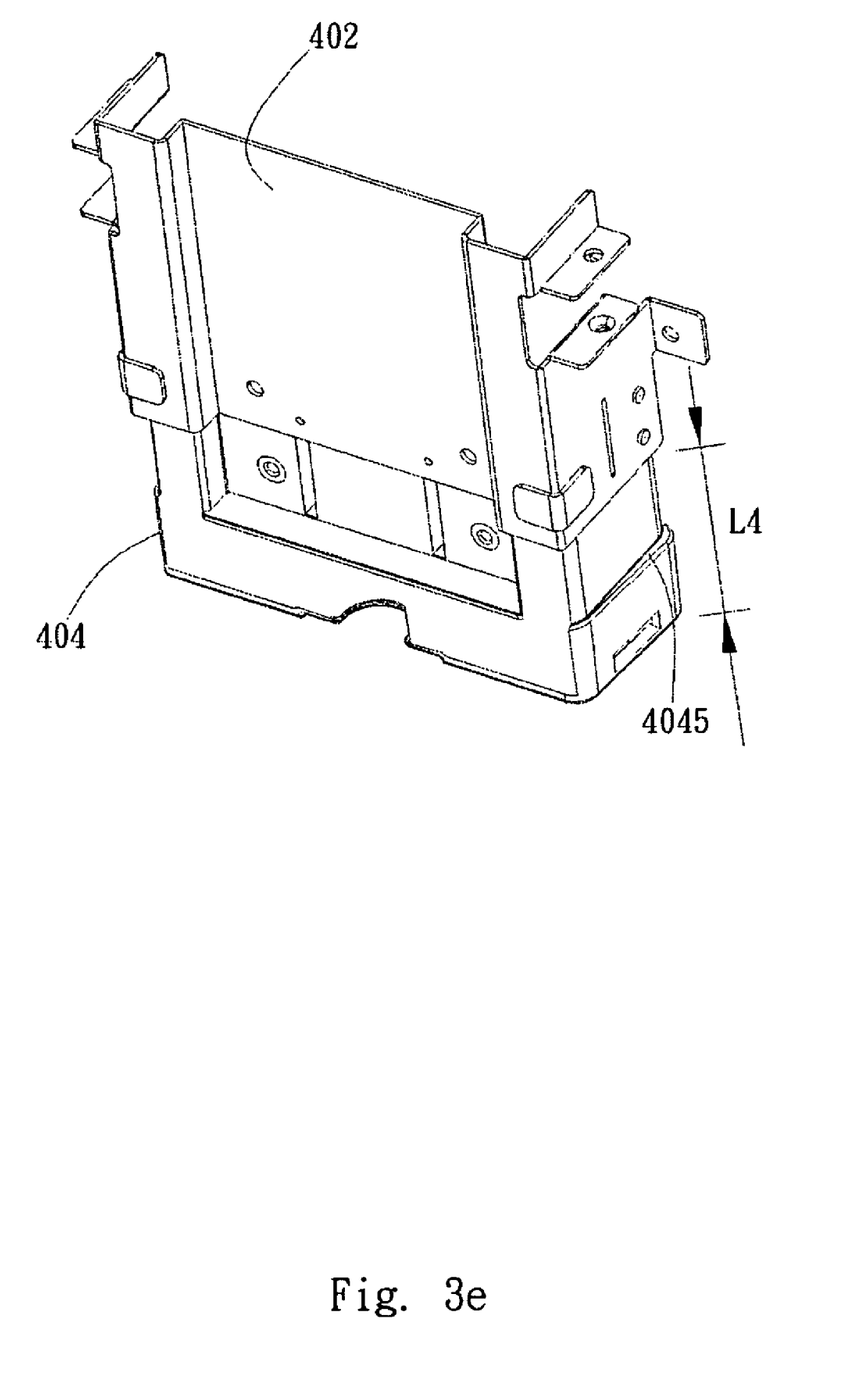
FIG. 3e is a perspective view of FIG. 3c.

FIG. 3d and FIG. 3e are schematic views of the supporting unit 402 and the linking unit 404 of the support module 400. FIG. 3b and FIG. 3d are schematic views when the linking unit 404 is at a first position relative to the supporting unit 402, at which the linking unit 404 extends out a third length $L_3$ from the supporting unit 402. FIG. 3c and FIG. 3e are schematic views when the inking unit 404 is at a second position relative to the supporting unit 402, at which the linking unit 404 extends out a fourth length $L_4$ from the supporting unit 402.

Please refer to FIG. 3b and FIG. 3d. The position of the linking unit 404 at which linking unit 404 extends out the first length $L_1$ from the receiving portion 210 is corresponding to the first position of the linking unit 404 at which the linking unit 404 extends out the third length $L_3$ from the supporting unit 402. When the linking unit 404 moves to the first position, the stop end 4045 of the linking unit 404 is against the edge of the supporting unit 402, so that the linking unit 404 can be stopped at the first position.

Please refer to FIG. 3c and FIG. 3e. The position of the linking unit 404 at which the linking unit 404 extends out the second length $L_2$ from the receiving portion 210 is corresponding to the second position of the linking unit 404 at which the linking unit 404 extends out the fourth length $L_4$ from the supporting unit 402. When the linking unit 404 moves to the second position, the limiting unit 4023 contacts against one end of the limiting groove 4043 of the linking unit 404, so that the linking unit 404 can fix with the supporting unit 402 at the second position. In this way, the linking unit 404 cannot have further movement along the supporting unit 402.

Please refer to FIG. 3a, a supporting rib 4027 is formed on the supporting unit 402, and is disposed at two sides of the same surface of the supporting unit 402. A linking rib 4047 is formed on the linking unit 404, disposed in accordance with the supporting rib 4027. The position of the supporting rib 4027 on the supporting unit 402 and the position of the linking rib 4047 on the linking unit 404 are not limited but they should be corresponding to each other. When the linking unit 404 is disposed in the supporting unit 402, the supporting rib 4027 and the linking rib 4047 are disposed in parallel manner along the moving direction of the linking unit 404. In other words, the linking rib 4047 is disposed inside the supporting rib 4027. Therefore, not only the linking unit 404 is guided into the supporting unit 402, but also the support module 400 can be strengthened.

Furthermore, please refer to FIG. 3a, a guiding unit 4029 is formed on the flat surface of the supporting unit 402, a guiding groove 4049 is formed on the flat surface of the linking unit 404. The guiding unit 4029 is movably disposed in the guiding groove 4049. For instance, the guiding unit 4029 is substantially a short rod or a protrusion, and the guiding groove 4049 is substantially a long rectangular shape groove. The guiding unit 4029 and the guiding groove 4049 are provided to guide the supporting unit 402 and the linking unit 404 moving along in a fix direction, and to prevent problems caused by undesired movements.

Although the preferred embodiments of the present invention have been described herein, the above description is merely illustrative. Further modifications of the invention disclosed herein will occur to those skilled in the respective arts and all such modifications are deemed to be within the scope of the invention as defined by the appended claims.

What is claimed is:

1. A display device, comprising:
   a display module housing with a receiving portion formed thereon;
   a display module, disposed within the display module housing; and
   a support module, including:
      a supporting unit, disposed in the receiving portion and positioned between the display module and the display module housing, the supporting unit having a supporting positioning portion; and a linking unit, having a first linking positioning portion and a second linking positioning portion, wherein the supporting positioning portion is selectively connected to one of the first linking positioning portion and the second linking positioning portion;

wherein when the supporting positioning portion is connected to the first linking positioning portion, the linking unit extends out a first length from the receiving portion; when the supporting positioning portion is connected to the second linking positioning portion, the linking unit extends out a second length from the receiving portion and the second length is greater than the first length, the linking unit can be totally received in the receiving portion.

2. The display device of claim 1, wherein the support module further includes a fixing mechanism disposed through the supporting positioning portion and selectively through one of the first linking positioning portion and the second linking positioning portion, for connecting the supporting unit and the linking unit.

3. The display device of claim 2, wherein the fixing mechanism is a screw, the supporting positioning portion has a first hole, the first linking positioning portion has a first threaded hole, and the second linking positioning portion has a second threaded hole, the screw passes through the first hole and selectively fixes with one of the first threaded hole and with the second threaded hole.

4. The display device of claim 3, wherein the supporting positioning portion further includes a third hole, the first threaded hole and the second threaded hole of the first linking positioning portion are disposed correspondingly between the first hole and the third hole, and the screw passes through the first hole, selectively fixes with one of the first threaded hole and the second threaded hole, and passes through the third hole in sequence.

5. The display device of claim 2, wherein the supporting unit includes a hollow pillared structure, the linking unit is disposed in the hollow pillared structure, and the fixing mechanism passes through the hollow pillared structure and the linking unit.

6. The display device of claim 1, wherein the linking unit includes a limiting groove, the supporting unit includes a limiting unit disposed in the limiting groove to restrict the linking unit moving along and relatively to the support unit between a first position and a second position; wherein the first position is where the supporting positioning portion connects to the first linking positioning portion, the second position is where the supporting positioning portion connects to the second linking positioning portion.

7. The display device of claim 6, wherein the linking unit further includes a stop end, when the linking unit moves to the first position, the stop end contacts the supporting unit and prevents the linking unit from moving forward, and when the linking unit moves to the second position, the limiting unit contacts one end of the limiting groove.

8. The display device of claim 1, wherein the receiving portion of the display module housing is at bottom of the display module housing.

9. The display device of claim 1, further comprising a base having a base opening formed thereon, wherein when the linking unit extends out the second length from the receiving portion, the part of the linking unit extended out from the receiving portion is disposed in the base opening to connect the base and the display module housing; when the linking unit extends out the first length from the receiving portion, the base separates from the display module housing.

10. The display device of claim 1, wherein the supporting unit further includes a supporting rib, the linking unit has a linking rib, and the linking rib is disposed inside the supporting rib.

11. A support module, for supporting an object, the support module comprising:

a supporting unit, having a supporting positioning portion;

a linking unit, having a first linking positioning portion and a second liking positioning portion, wherein the supporting positioning portion is selectively connected to one of the first linking positioning portion and the second linking positioning portion;

a fixing mechanism for connecting the supporting unit and the linking unit, wherein the fixing mechanism is a screw, the supporting positioning portion includes a first hole and a third hole, the first linking positioning portion includes a first threaded hole, and the second linking positioning portion includes a second threaded hole, the screw passes through the first hole, selectively fixes with one of the first threaded hole and the second threaded hole, and passes through the third hole in sequence;

wherein when the supporting positioning portion connects to the first linking positioning portion, the linking unit extends out a third length from the supporting unit; when the supporting positioning portion connects to the second linking positioning portion, the linking unit extends out a fourth length from the supporting unit, and the fourth length is greater than the third length.

12. The support module of claim 11, wherein the linking unit includes a limiting groove, the supporting unit includes a limiting unit disposed in the limiting groove to restrict the linking unit moving along and relatively to the support unit between a first position and a second position; the first position is where the supporting positioning portion connects to the first linking positioning portion, the second position is where the supporting positioning portion connects to the second linking positioning portion.

13. The support module of claim 11, wherein the support unit further includes a guiding unit, the linking unit further includes a guiding groove, and the guiding unit moves in the guiding groove.

14. A display device, comprising:

a display module;

a display module housing, having a substantially flat rear surface and a receiving portion, the receiving portion formed between the display module and the rear surface;

a supporting unit, disposed in the receiving portion, the supporting unit connected to the display module, the supporting unit having supporting positioning portion; and a linking unit, having a first linking positioning portion and a second linking positioning portion;

wherein when the supporting positioning portion connects to the first linking positioning portion, the linking unit extends out a third length from the supporting unit, thereby the substantially flat rear surface stays close to a wall surface in parallel; when the supporting positioning portion connects to the second linking positioning portion, the linking unit extends out a second length from the receiving portion and the second length is greater than the first length, the linking unit can be totally received in the receiving portion.

15. The display device of claim 14, further comprising a fixing mechanism, the rear surface having a rear opening, and the fixing mechanism being disposed through the rear opening, the supporting positioning portion and the linking unit.

* * * * *